US012748268B2

(12) United States Patent
Huang

(10) Patent No.: US 12,748,268 B2
(45) Date of Patent: Sep. 29, 2026

(54) 400G SILICON PHOTONIC INTEGRATED OPTICAL MODULE WITH PHOTOELECTRIC INTEGRATED SUBSTRATE

(71) Applicant: SHUNYUN TECHNOLOGY (ZHONGSHAN) Limited, Zhongshan (CN)

(72) Inventor: Jie Huang, Zhongshan (CN)

(73) Assignee: SHUNYUN TECHNOLOGY (ZHONGSHAN) Limited, Zhongshan (CN)

( * ) Notice: Subject to any disclaimer, the term of this patent is extended or adjusted under 35 U.S.C. 154(b) by 348 days.

(21) Appl. No.: 18/437,260

(22) Filed: Feb. 9, 2024

(65) Prior Publication Data

US 2024/0280768 A1 Aug. 22, 2024

(30) Foreign Application Priority Data

Feb. 21, 2023 (CN) ........................ 202310149731.1

(51) Int. Cl.
*G02B 6/42* (2006.01)

(52) U.S. Cl.
CPC ......... *G02B 6/4204* (2013.01); *G02B 6/4214* (2013.01); *G02B 6/424* (2013.01); *G02B 6/4245* (2013.01); *G02B 6/428* (2013.01); *G02B 6/4295* (2013.01); *G02B 6/4244* (2013.01)

(58) Field of Classification Search
CPC .. G02B 6/4204; G02B 6/4206; G02B 6/4214; G02B 6/4246; G02B 6/428
See application file for complete search history.

(56) References Cited

U.S. PATENT DOCUMENTS

2023/0194808 A1* 6/2023 Hu ...................... G02B 6/4204 385/33
2024/0159969 A1* 5/2024 Doi ...................... G02B 6/428

FOREIGN PATENT DOCUMENTS

CN 110764202 A 2/2020
GB 2353405 A * 2/2001

* cited by examiner

*Primary Examiner* — Michael Stahl

(57) ABSTRACT

A 400G silicon photonic integrated optical module with a photoelectric integrated substrate includes a printed circuit board (PCB) substrate, a fiber array, a detector assembly, and a laser assembly, where the fiber array, the detector assembly and the laser assembly are mounted on a surface of the PCB substrate; a recessed groove is formed in the surface of the PCB substrate; a silicon substrate is attached in the recessed groove; optical waveguides are arranged in the silicon substrate in parallel; a surface circuit board is further mounted at an upper side of the silicon substrate; a first microlens and a second microlens are further provided in the recessed groove; and an optical transmission path is formed between a fiber port of the fiber array, the first microlens, the optical waveguide, the second microlens, and the detector assembly or the laser assembly.

10 Claims, 5 Drawing Sheets

400G SILICON PHOTONIC INTEGRATED OPTICAL MODULE WITH PHOTOELECTRIC INTEGRATED SUBSTRATE

CROSS REFERENCE TO RELATED APPLICATIONS

The present application claims the benefit of Chinese Patent Application No. 2023101497311 filed on Feb. 21, 2023, the contents of which are incorporated herein by reference in their entirety.

TECHNICAL FIELD

The present disclosure relates to the technical field of optical modules, and in particular to a 400G silicon photonic integrated optical module with a photoelectric integrated substrate.

BACKGROUND

With rapid development of optical communication, fiber media are extensively used to realize high-speed data transmission. As a core of a fiber communication system, an optical module works based on a principle of converting an optical signal into an electrical signal and converting an electrical signal into an optical signal.

For example, the Chinese Patent Application No. CN 110764202 A, filed on Feb. 7, 2020, provides a 400G optical module. The 400G optical module specifically includes a main heat dissipation shell, an auxiliary heat dissipation shell, and a printed circuit board (PCB). A control chip is provided on the PCB. The PCB is connected to a laser. A front side of the laser is sequentially provided with an optical assembly and a fiber array. The fiber array is connected to a fiber. The 400G optical module further includes a thermal electric cooler (TEC). The laser and a lower end of the fiber array are attached to the TEC. The 400G optical module further includes a shielding cover. The laser, the optical assembly, and the fiber array can be sealed by the shielding cover. A metal heat sink includes an extension portion extending to a rear side of the fiber array. A fiber groove is formed in the extension portion corresponding to each fiber. A lower end of the metal heat sink, the fiber groove, and an upper end of the fiber groove each are provided with a heat conductive pad. The head conductive pad is attached to the main heat dissipation shell and the auxiliary heat dissipation shell.

According to the 400G optical module in the prior art, the optical assembly and the fiber array are provided at the front side of the laser. The fiber of the fiber array is provided in the fiber groove in the extension portion of the metal heat sink. However, since the fiber is provided on the PCB and extends to the front side of the laser, the fiber has a large extended length in the shell to cause a waste, takes up a space of the PCB, and makes other electronic elements not provided on the PCB reasonably.

SUMMARY

An objective of the present disclosure is to provide a 400G silicon photonic integrated optical module with a photoelectric integrated substrate, to solve problems that the fiber has a large extended length in the shell to cause a waste, takes up a space of the PCB, and makes other electronic elements not provided on the PCB reasonably.

The 400G silicon photonic integrated optical module with a photoelectric integrated substrate provided by the present disclosure employs the following technical solutions:

A 400G silicon photonic integrated optical module with a photoelectric integrated substrate includes a PCB substrate, a fiber array, a detector assembly, a laser assembly, and a silicon substrate, where the fiber array, the detector assembly and the laser assembly are mounted on a surface of the PCB substrate;

a recessed groove is formed in the surface of the PCB substrate; the silicon substrate is attached in the recessed groove; the fiber array is located at one side of the recessed groove; and the detector assembly and the laser assembly are located at the other side of the recessed groove;

a plurality of optical waveguides are arranged in the silicon substrate in parallel; the optical waveguides each extend from one side of the recessed groove to the other side of the recessed groove; a surface circuit board is further mounted at an upper side of the silicon substrate; and the surface circuit board is flush with the PCB substrate;

a first microlens and a second microlens are further provided in the recessed groove; a fiber port of the fiber array is provided with a light reflecting surface; the first microlens is located directly below the light reflecting surface; and the second microlens is located directly below the detector assembly or the laser assembly; and an optical transmission path is formed among the fiber port of the fiber array, the first microlens, the optical waveguide, the second microlens and the detector assembly, or formed among the fiber port of the fiber array, the first microlens, the optical waveguide, the second microlens and the laser assembly.

Further, the light reflecting surface is inclined at 45° relative to the PCB substrate; the first microlens is provided with a first reflecting surface; the second microlens is provided with a second reflecting surface; the first reflecting surface and the second reflecting surface are inclined at 45° relative to the PCB substrate respectively; and an inclination direction of the first reflecting surface is opposite to an inclination direction of the second reflecting surface.

Further, the first microlens is of an elongated shape; a length direction of the first microlens is parallel to a width direction of the fiber array; a first oblique cut is formed in a lower portion of the first microlens; the first oblique cut matches with an edge at one side of the silicon substrate in a concave-convex manner; and an oblique surface of the first oblique cut forms the first reflecting surface.

Further, structures of the first microlens and the second microlens are the same; a second oblique cut is formed in a lower portion of the second microlens; the second oblique cut matches with an edge at the other side of the silicon substrate in a concave-convex manner; and an oblique surface of the second oblique cut forms the second reflecting surface.

Further, an upper side of the first microlens is fixedly connected to a locating member; a locating groove is formed at a side of the locating member towards the fiber array; a bottom of the locating groove is provided with a stop oblique surface; and the stop oblique surface matches with the fiber port of the fiber array in a concave-convex manner.

Further, there are a plurality of the locating grooves; the plurality of the locating grooves are spaced along the width direction of the fiber array; the locating grooves each are opposite to a corresponding one of the optical waveguides;

and an upper wall of the locating groove matches with an upper contour of the fiber port of the fiber array.

Further, the PCB substrate is formed by stacking a plurality of circuit boards, and includes a bottom circuit board, the surface circuit board, and a middle circuit board provided between the bottom circuit board and the surface circuit board; a vacant region is reserved on the middle circuit board; and the vacant region forms the recessed groove.

Further, the detector assembly and the laser assembly are spaced along a width direction of the fiber array; the detector assembly is provided on the PCB substrate in an upside-down manner, with a photo detector active area thereof facing down; and the laser assembly is provided on the PCB substrate in an upside-down manner, with a photo detector active area thereof facing down.

Further, a driver and a trans-impedance amplifier are further provided on the PCB substrate in an upside-down manner; solder balls are respectively welded between a lower side of the trans-impedance amplifier and the surface of the PCB substrate, as well as between a lower side of the driver and the surface of the PCB substrate; the detector assembly is welded at the lower side of the trans-impedance amplifier through a micro-solder ball; and the laser assembly is welded at the lower side of the driver through a micro-solder ball.

Further, a digital signal processor and an electronic element are further mounted on the PCB substrate; one end of the fiber array is connected to a multi-fiber push on (MPO) optical connector; and an end of the PCB substrate away from the fiber array is provided with a gold finger electrical connector.

The present disclosure has the following beneficial effects: The 400G silicon photonic integrated optical module with a photoelectric integrated substrate uses the PCB substrate, the fiber array, the detector assembly, the laser assembly and the silicon substrate. The fiber array, the detector assembly and the laser assembly are mounted on the surface of the PCB substrate. The fiber array is located at one side of the recessed groove of the PCB substrate. The detector assembly and the laser assembly are located at the other side of the recessed groove of the PCB substrate. That is, at two sides of the recessed groove, the fiber array is opposite to the detector assembly and the laser assembly.

A plurality of optical waveguides are arranged in the silicon substrate in parallel. The surface circuit board is further mounted at the upper side of the silicon substrate. The optical waveguide forms a hidden optical path from one side of the recessed groove to the other side of the recessed groove. Without affecting other electronic elements mounted on the surface circuit board, this realizes transmission of an optical signal in the PCB substrate.

Moreover, the first microlens and the second microlens are further provided in the recessed groove. The fiber port of the fiber array is provided with the light reflecting surface. For a receiving optical path, the optical signal is transmitted from the fiber port, enters the first microlens through the light reflecting surface, and then is transmitted to the optical waveguide through the first microlens. At last, the optical signal is transmitted to the detector assembly through the second microlens. For a transmitting optical path, the optical signal is transmitted from the laser assembly, enters the optical waveguide through the second microlens, and is then transmitted to the light reflecting surface through the first microlens. At last, the optical signal is transmitted to the fiber port.

According to the silicon photonic integrated optical module, the silicon substrate having the optical waveguide are buried in the PCB substrate, and the first microlens and the second microlens are provided, such that the optical signal can be transmitted in the PCB substrate in a hidden manner. This ensures accurate and high-rate transmission of the optical signal, shortens a length of the required fiber, takes up a less space on the PCB substrate, and makes other electronic elements provided on the PCB substrate reasonably.

Figure 1:
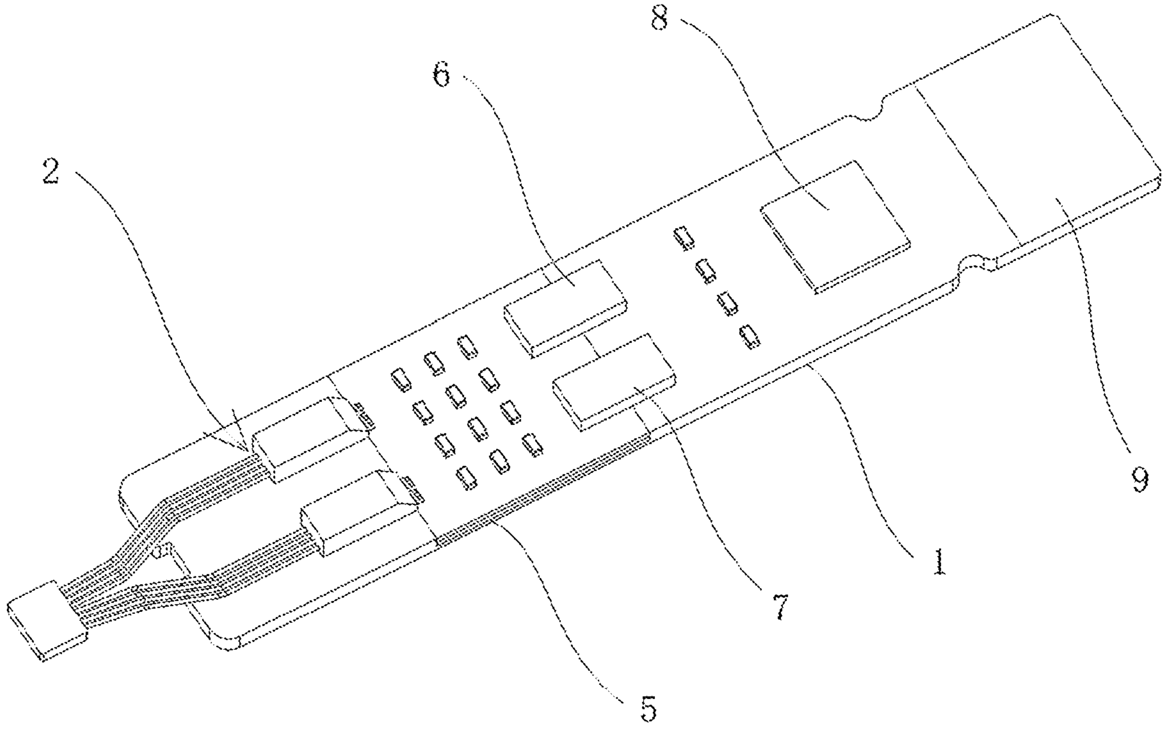
FIG. 1 is a schematic perspective view of a silicon photonic integrated optical module in an embodiment of a 400G silicon photonic integrated optical module with a photoelectric integrated substrate provided by the present disclosure.
Figure 2:
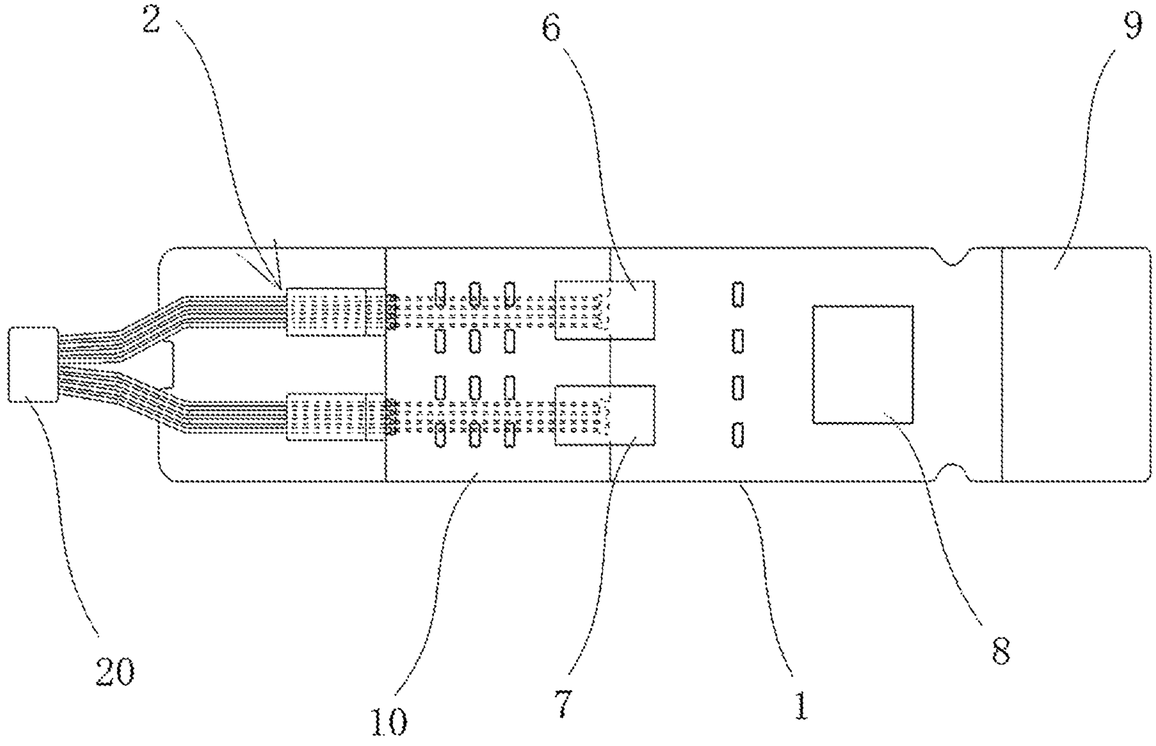
FIG. 2 is a schematic top view of the silicon photonic integrated optical module in FIG. 1.
Figure 3:
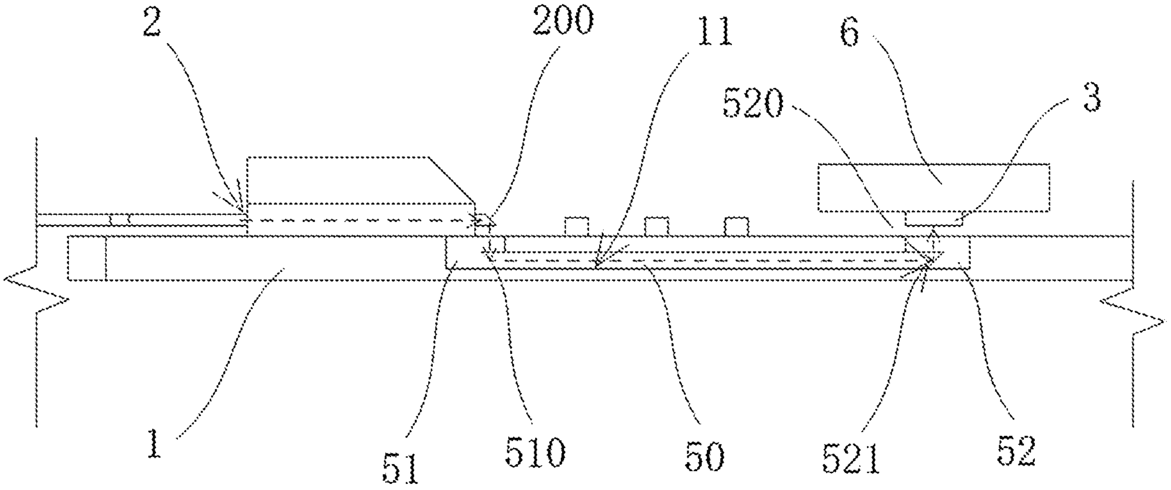
FIG. 3 is a schematic view of an optical transmission path of a detector assembly in an embodiment of a 400G silicon photonic integrated optical module with a photoelectric integrated substrate provided by the present disclosure.
Figure 4:
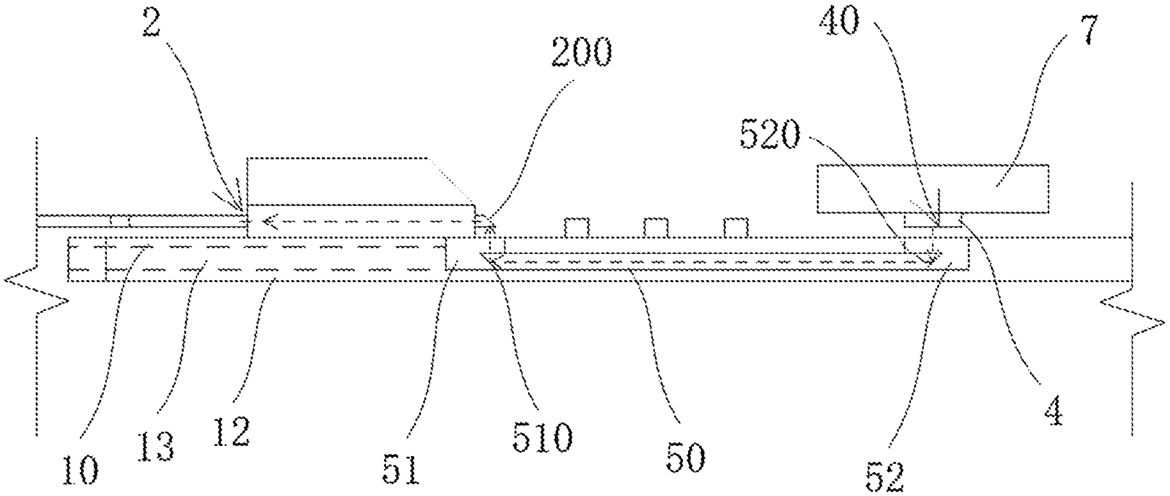
FIG. 4 is a schematic view of an optical transmission path of a laser assembly in an embodiment of a 400G silicon photonic integrated optical module with a photoelectric integrated substrate provided by the present disclosure.

In the figures: 1: PCB substrate, 10: surface circuit board, 11: recessed groove, 12: bottom circuit board, 13: middle circuit board, 2: fiber array, 20: MPO optical connector, and 200: light reflecting surface;

- 3: detector assembly, 30: photo detector active area of detector assembly, 4: laser assembly, 40: of laser assembly, 5: silicon substrate, 50: optical waveguide, 51: first microlens, 510: first reflecting surface, 511: first oblique cut, 52: second microlens, 520: second reflecting surface, 521: second oblique cut, 53: locating member, 54: locating groove, and 540: stop oblique surface; and
- 6: trans-impedance amplifier, 60: solder ball, 61: micro-solder ball, 7: driver, 8: digital signal processor, and 9: gold finger electrical connector.

DETAILED DESCRIPTION

The specific implementations of the present disclosure are described in more detail below with reference to the accompanying drawings and embodiments. The following embodiments are intended to illustrate the present disclosure, but not to limit the scope of the present disclosure.

Specific Embodiment 1 of a 400G silicon photonic integrated optical module with a photoelectric integrated substrate provided by the present disclosure is as shown in FIG. 1 to FIG. 7. The 400G silicon photonic integrated optical module with a photoelectric integrated substrate includes a PCB substrate 1, a fiber array 2, a detector assembly 3, a laser assembly 4, and a silicon substrate 5. The fiber array 2, the detector assembly 3 and the laser assembly 4 are mounted on a surface of the PCB substrate 1. A recessed groove 11 is formed in the surface of the PCB substrate 1. The silicon substrate 5 is attached in the recessed groove 11. The fiber array 2 is located at one side of the recessed groove. The detector assembly 3 and the laser assembly 4 are located at the other side of the recessed groove 11.

A plurality of optical waveguides 50 are arranged in the silicon substrate 5 in parallel. The optical waveguides 50 each extend from one side of the recessed groove to the other side of the recessed groove. A surface circuit board 10 is further mounted at an upper side of the silicon substrate 5. The surface circuit board 10 is flush with the surface of the PCB substrate 1. A first microlens 51 and a second microlens 52 are further provided in the recessed groove. A fiber port of the fiber array 2 is provided with a light reflecting surface 200. The first microlens 51 is located directly below the light reflecting surface 200. The second microlens 52 is located directly below the detector assembly 3 or the laser assembly 4. An optical transmission path is formed among the fiber port of the fiber array 2, the first microlens 51, the optical waveguide 50, the second microlens 52 and the detector assembly 3, or formed among the fiber port of the fiber array 2, the first microlens 51, the optical waveguide 50, the second microlens 52 and the laser assembly 4. Herein, one component is located directly below the other component, which refers to that the one component is located at an underside of a horizontal plane of the other component, and projection of the one component on the horizontal plane coincides with projection of the other component on the horizontal plane.

The 400G silicon photonic integrated optical module with a photoelectric integrated substrate uses the PCB substrate 1, the fiber array 2, the detector assembly 3, the laser assembly 4 and the silicon substrate 5. The fiber array 2, the detector assembly 3 and the laser assembly 4 are mounted on the surface of the PCB substrate 1. The fiber array 2 is located at one side of the recessed groove of the PCB substrate 1. The detector assembly 3 and the laser assembly 4 are located at the other side of the recessed groove of the PCB substrate 1. That is, at two sides of the recessed groove, the fiber array 2 is opposite to the detector assembly 3 and the laser assembly 4.

A plurality of optical waveguides 50 are arranged in the silicon substrate 5 in parallel. The surface circuit board 10 is further mounted at the upper side of the silicon substrate 5. The optical waveguide 50 forms a hidden optical path from one side of the recessed groove to the other side of the recessed groove. Without affecting other electronic elements mounted on the surface circuit board 10, this realizes transmission of an optical signal in the PCB substrate 1.

Moreover, the first microlens 51 and the second microlens 52 are further provided in the recessed groove. The fiber port of the fiber array 2 is provided with the light reflecting surface 200. For a receiving optical path, the optical signal is transmitted from the fiber port, enters the first microlens 51 through the light reflecting surface 200, and then is transmitted to the optical waveguide 50 through the first microlens 51. At last, the optical signal is transmitted to the detector assembly 3 through the second microlens 52. For a transmitting optical path, the optical signal is transmitted from the laser assembly 4, enters the optical waveguide 50 through the second microlens 52, and is then transmitted to the light reflecting surface 200 through the first microlens 51. At last, the optical signal is transmitted to the fiber port.

According to the silicon photonic integrated optical module, the silicon substrate 5 having the optical waveguide 50 is buried in the PCB substrate 1, and the first microlens 51 and the second microlens 52 are provided, such that the optical signal can be transmitted in the PCB substrate 1 in a hidden manner. This ensures accurate and high-rate transmission of the optical signal, shortens a length of the required fiber, takes up a less space on the PCB substrate 1, and makes other electronic elements provided on the PCB substrate 1 reasonably.

In the embodiment, the light reflecting surface 200 is inclined at 45° relative to the PCB substrate 1. The first microlens 51 is provided with a first reflecting surface 510. The second microlens 52 is provided with a second reflecting surface 520. The first reflecting surface 510 of the first microlens 51 and the second reflecting surface 520 of the second microlens 52 are inclined at 45° relative to the PCB substrate 1 respectively. An inclination direction of the first reflecting surface 510 is opposite to an inclination direction of the second reflecting surface 520. This ensures that the optical signal can be accurately transmitted to a corresponding component through the light reflecting surface 200, the first reflecting surface 510 and the second reflecting surface 520, and makes the optical transmission path more accurate and reliable.

As a further preferred solution, the first microlens 51 is of an elongated shape. A length direction of the first microlens 51 is parallel to a width direction of the fiber array 2. A first oblique cut 511 is formed in a lower portion of the first microlens 51. The first oblique cut 511 matches with an edge at one side of the silicon substrate 5 in a concave-convex manner. An oblique surface of the first oblique cut 511 forms the first reflecting surface 510. Correspondingly, structures of the first microlens 51 and the second microlens 52 are the same. A second oblique cut 521 is formed in a lower portion of the second microlens 52. The second oblique cut 521 matches with an edge at the other side of the silicon substrate 5 in a concave-convex manner. An oblique surface of the second oblique cut 521 forms the second reflecting surface 520.

Figure 5:
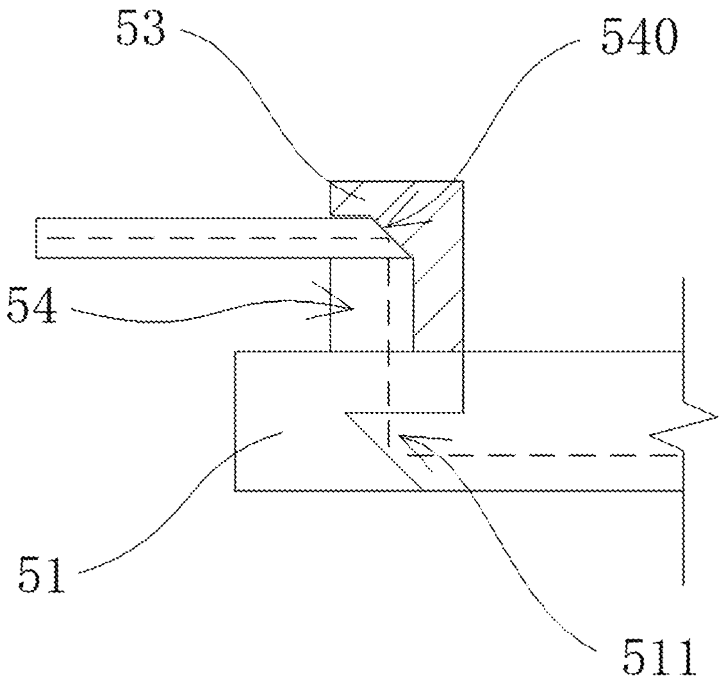
FIG. 5 is a schematic sectional view of a locating member in an embodiment of a 400G silicon photonic integrated optical module with a photoelectric integrated substrate provided by the present disclosure.
Figure 6:
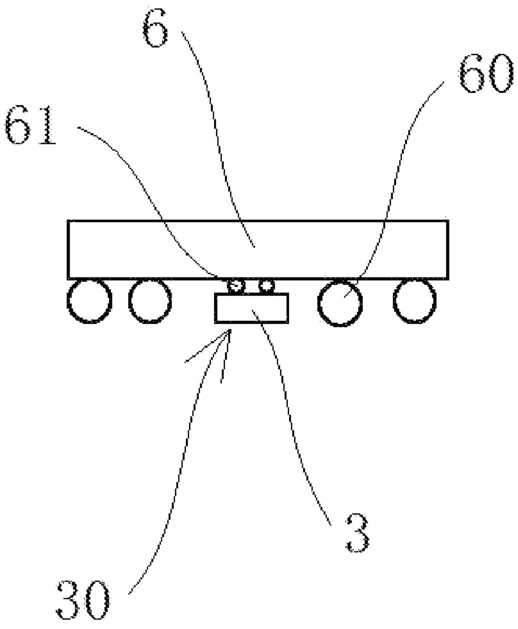
FIG. 6 is a schematic front view of a detector assembly and a trans-impedance amplifier in an embodiment of a 400G silicon photonic integrated optical module with a photoelectric integrated substrate provided by the present disclosure.
Figure 7:
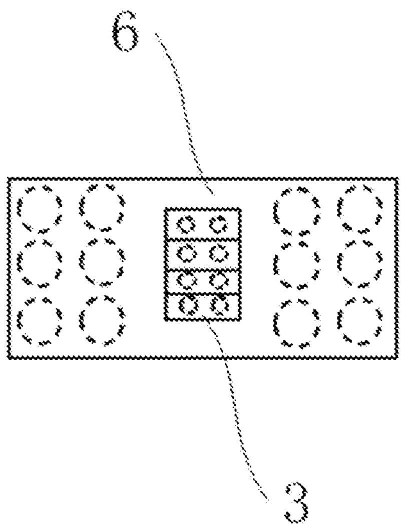
FIG. 7 is a schematic top view of the detector assembly and the trans-impedance amplifier in FIG. 6.

An upper side of the first microlens 51 is fixedly connected to a locating member 53, as shown in FIG. 5. A locating groove 54 is formed at a side of the locating member 53 towards the fiber array 2. A bottom of the locating groove 54 is provided with a stop oblique surface 540. The stop oblique surface of the locating groove 54 matches with the fiber port of the fiber array 2 in a concave-convex manner. There are a plurality of the locating grooves 54. The plurality of the locating grooves 54 are spaced along the width direction of the fiber array 2. The locating grooves 54 each are opposite to a corresponding one of the optical waveguides 50. An upper wall of the locating groove 54 matches with an upper contour of the fiber port of the fiber array 2.

The locating groove 54 has an arched inner contour. The bottom of the locating groove 54 away from the fiber array 2 is provided with the stop oblique surface. With the stop oblique surface, an insertion position of the fiber can be limited, and the light reflecting surface of the fiber port is inclined at 45°. Thus, the optical signal can be accurately reflected to the first microlens 51 or the fiber. The upper wall of the locating groove 54 is a circular arc wall. This can match with an upper contour of the fiber port desirably and ensure an accuracy of a fiber access position.

In the embodiment, the PCB substrate 1 is formed by stacking a plurality of circuit boards, and includes a bottom circuit board 12, the surface circuit board 10, and a middle circuit board 13 provided between the bottom circuit board 12 and the surface circuit board 10. A vacant region is reserved on the middle circuit board 13. The vacant region forms the recessed groove 11. As a further preferred solution, the detector assembly 3 and the laser assembly 4 are spaced along a width direction of the fiber array 2. The detector assembly is provided on the PCB substrate 1 in an upside-down manner, with a photo detector active area 30 thereof facing down. The laser assembly is provided on the PCB substrate 1 in an upside-down manner, with a photo detector active area 40 thereof facing down.

In addition, a trans-impedance amplifier 6 and a driver 7 are further provided on the PCB substrate 1 in an upside-down manner. Solder balls 60 are respectively welded between a lower side of the trans-impedance amplifier 6 and the surface of the PCB substrate 1, as well as between a lower side of the driver 7 and the surface of the PCB substrate 1. The detector assembly 3 is welded at the lower side of the trans-impedance amplifier 6 through a micro-solder ball 61. The laser assembly 4 is welded at the lower side of the driver 7 through a micro-solder ball 61. A digital signal processor 8 and an electronic element are further mounted on the PCB substrate 1. One end of the fiber array 2 is connected to a multi-fiber push on (MPO) optical connector 20. An end of the PCB substrate 1 away from the fiber array 2 is provided with a gold finger electrical connector 9.

The foregoing are merely descriptions of the preferred embodiments of the present disclosure. It should be noted that several improvements and replacements can be made by a person of ordinary skill in the art without departing from the technical principle of the present disclosure, and these improvements and replacements shall also be deemed as falling within the protection scope of the present disclosure.

The invention claimed is:

1. A 400G silicon photonic integrated optical module with a photoelectric integrated substrate, comprising a printed circuit board (PCB) substrate, a fiber array, a detector assembly, a laser assembly, and a silicon substrate, wherein the fiber array, the detector assembly, and the laser assembly are mounted on a surface of the PCB substrate;

a recessed groove is formed in the surface of the PCB substrate; the silicon substrate is attached in the recessed groove; the fiber array is located at one side of the recessed groove; and the detector assembly and the laser assembly are located at another side of the recessed groove;

a plurality of optical waveguides are arranged in the silicon substrate in parallel; the optical waveguides each extend from one side of the recessed groove to another side of the recessed groove; a surface circuit board is further mounted at an upper side of the silicon substrate; and the surface circuit board is flush with the PCB substrate;

a first microlens and a second microlens are further provided in the recessed groove; a fiber port of the fiber array is provided with a light reflecting surface; the first microlens is located directly below the light reflecting surface; and the second microlens is located directly below the detector assembly or the laser assembly; and an optical transmission path is formed among the fiber port of the fiber array, the first microlens, the optical waveguide, the second microlens and the detector assembly, or formed among the fiber port of the fiber array, the first microlens, the optical waveguide, the second microlens and the laser assembly.

2. The 400G silicon photonic integrated optical module with a photoelectric integrated substrate according to claim 1, wherein the light reflecting surface is inclined at 45° relative to the PCB substrate; the first microlens is provided with a first reflecting surface; the second microlens is provided with a second reflecting surface; the first reflecting surface and the second reflecting surface are inclined at 45° relative to the PCB substrate respectively; and an inclination direction of the first reflecting surface is opposite to an inclination direction of the second reflecting surface.

3. The 400G silicon photonic integrated optical module with a photoelectric integrated substrate according to claim 2, wherein the first microlens is of an elongated shape; a length direction of the first microlens is parallel to a width direction of the fiber array; a first oblique cut is formed in a lower portion of the first microlens; the first oblique cut matches with an edge at one side of the silicon substrate in a concave-convex manner; and an oblique surface of the first oblique cut forms the first reflecting surface.

4. The 400G silicon photonic integrated optical module with a photoelectric integrated substrate according to claim 3, wherein structures of the first microlens and the second microlens are the same; a second oblique cut is formed in a lower portion of the second microlens; the second oblique cut matches with an edge at the other side of the silicon substrate in a concave-convex manner; and an oblique surface of the second oblique cut forms the second reflecting surface.

5. The 400G silicon photonic integrated optical module with a photoelectric integrated substrate according to claim 4, wherein an upper side of the first microlens is fixedly connected to a locating member; a locating groove is formed at a side of the locating member towards the fiber array; a bottom of the locating groove is provided with a stop oblique surface; and the stop oblique surface matches with the fiber port of the fiber array in a concave-convex manner.

6. The 400G silicon photonic integrated optical module with a photoelectric integrated substrate according to claim 5, wherein there are a plurality of the locating grooves; the plurality of the locating grooves are spaced along the width direction of the fiber array; the locating grooves each are opposite to a corresponding one of the optical waveguides; and an upper wall of each locating groove matches with an upper contour of the fiber port of the fiber array.

7. The 400G silicon photonic integrated optical module with a photoelectric integrated substrate according to claim 1, wherein the PCB substrate is formed by stacking a plurality of circuit boards, and comprises a bottom circuit board, the surface circuit board, and a middle circuit board provided between the bottom circuit board and the surface circuit board; a vacant region is provided on the middle circuit board; and the vacant region forms the recessed groove.

8. The 400G silicon photonic integrated optical module with a photoelectric integrated substrate according to claim 1, wherein the detector assembly and the laser assembly are spaced along a width direction of the fiber array; the detector assembly is provided on the PCB substrate in an upside-down manner, with a photo detector active area thereof facing down; and the laser assembly is provided on the PCB substrate in an upside-down manner, with a photo detector active area thereof facing down.

9. The 400G silicon photonic integrated optical module with a photoelectric integrated substrate according to claim 8, wherein a driver and a trans-impedance amplifier are further provided on the PCB substrate in an upside-down manner; solder balls are respectively welded between a lower side of the trans-impedance amplifier and the surface of the PCB substrate, as well as between a lower side of the driver and the surface of the PCB substrate; the detector assembly is welded at the lower side of the trans-impedance amplifier through a micro-solder ball; and the laser assembly is welded at the lower side of the driver through a micro-solder ball.

10. The 400G silicon photonic integrated optical module with a photoelectric integrated substrate according to claim 1, wherein a digital signal processor and an electronic element are further mounted on the PCB substrate; one end of the fiber array is connected to a multi-fiber push on (MPO) optical connector; and an end of the PCB substrate away from the fiber array is provided with a gold finger electrical connector.

* * * * *